US011440283B2

(12) United States Patent
Turner et al.

(10) Patent No.: US 11,440,283 B2
(45) Date of Patent: Sep. 13, 2022

(54) COMPOSITE SANDWICH PANELS WITH OVER-CRUSHED EDGE REGIONS

(71) Applicant: The Boeing Company, Chicago, IL (US)

(72) Inventors: Jason Turner, Marysville, IL (US); Mitchell Zachary Kotlik, Everett, WA (US); Christopher Robert Schwartz, Snohomish, WA (US); Michael B. Black, Seattle, WA (US)

(73) Assignee: The Boeing Company, Chicago, IL (US)

( * ) Notice: Subject to any disclaimer, the term of this patent is extended or adjusted under 35 U.S.C. 154(b) by 203 days.

(21) Appl. No.: 15/887,839

(22) Filed: Feb. 2, 2018

(65) Prior Publication Data

US 2019/0240949 A1 Aug. 8, 2019

(51) Int. Cl.
*B29C 70/54* (2006.01)
*B32B 3/02* (2006.01)
*B32B 3/12* (2006.01)
*B32B 3/30* (2006.01)
*B29C 43/02* (2006.01)
(Continued)

(52) U.S. Cl.
CPC ............... *B32B 3/12* (2013.01); *B29C 43/02* (2013.01); *B29C 43/203* (2013.01); *B29C 43/36* (2013.01); *B29C 43/40* (2013.01); *B29C 70/026* (2013.01); *B29C 70/545* (2013.01); *B29C 70/763* (2013.01); *B29D 99/0089* (2013.01); *B32B 3/02* (2013.01); *B32B 3/30* (2013.01); *B29C 70/685* (2013.01); *B29C 70/72* (2013.01); *B29C 2043/403* (2013.01); *B29C 2793/009* (2013.01); *B29C 2793/0027* (2013.01); *B29L 2031/3076* (2013.01); *B29L 2031/608* (2013.01); *B29L 2031/72* (2013.01); *B32B 2250/40* (2013.01); *B32B 2605/18* (2013.01)

(58) Field of Classification Search
CPC ................................ B29C 43/02; B29C 70/44
See application file for complete search history.

(56) References Cited

U.S. PATENT DOCUMENTS 3,234,065 A * 2/1966 Best ..................... B32B 27/00
156/224
3,879,245 A * 4/1975 Fetherston ............. B32B 17/10
156/245

(Continued)

FOREIGN PATENT DOCUMENTS

DE 102015111537 A1 1/2017
EP 3037256 A1 6/2016

OTHER PUBLICATIONS

European Patent Office Extended Search Report, dated Aug. 1, 2019, regarding U.S. Appl. No. 18/248,072 3, 8 pages.

*Primary Examiner* — Matthew J Daniels
*Assistant Examiner* — Andrew D Graham
(74) *Attorney, Agent, or Firm* — Yee & Associates, P.C.

(57) ABSTRACT

A composite sandwich panel comprises a first composite skin, a second composite skin, a hollow cell core between the first composite skin and the second composite skin, and a first over-crush edge region with a first edge. The first edge has a first thickness at least 40% less than a nominal thickness of the composite sandwich panel. The first over-crush edge region has a length of at least 0.25 inches over which a thickness of the composite sandwich panel decreases.

17 Claims, 8 Drawing Sheets

(51) Int. Cl.

| | | |
|---|---|---|
| *B29C 43/20* | (2006.01) | |
| *B29C 70/02* | (2006.01) | |
| *B29D 99/00* | (2010.01) | |
| *B29C 43/36* | (2006.01) | |
| *B29C 70/76* | (2006.01) | |
| *B29C 43/40* | (2006.01) | |
| B29L 31/30 | (2006.01) | |
| B29L 31/60 | (2006.01) | |
| B29C 70/68 | (2006.01) | |
| B29L 31/00 | (2006.01) | |
| B29C 70/72 | (2006.01) | |

(56) References Cited

U.S. PATENT DOCUMENTS

| | | | |
|---|---|---|---|
| 3,995,984 A * | 12/1976 | Fetherston | A63C 5/12 425/521 |
| 4,042,746 A * | 8/1977 | Hofer | B29C 44/5618 428/308.4 |
| 4,059,660 A * | 11/1977 | Roth | B29C 70/088 264/46.4 |
| 4,119,749 A * | 10/1978 | Roth | B32B 3/28 428/99 |
| 4,327,049 A * | 4/1982 | Miller | B29C 44/569 264/138 |
| 4,432,716 A * | 2/1984 | Kiss | B27N 5/00 264/109 |
| 4,474,840 A * | 10/1984 | Adams | B29C 44/12 428/71 |
| 4,657,717 A * | 4/1987 | Cattanach | B29C 43/3642 264/102 |
| 4,816,329 A * | 3/1989 | Arnaud | B29C 43/006 264/257 |
| 4,824,714 A * | 4/1989 | Gest | B60R 13/0225 428/156 |
| 4,876,055 A * | 10/1989 | Cattanach | B29C 43/10 264/512 |
| 5,030,488 A * | 7/1991 | Sobolev | B29C 70/028 428/35.9 |
| 5,111,579 A * | 5/1992 | Andersen | B29C 43/203 156/222 |
| 5,227,113 A * | 7/1993 | Hamabe | B29B 11/16 264/258 |
| 5,585,155 A * | 12/1996 | Heikkila | B29C 70/08 428/34.1 |
| 5,591,289 A * | 1/1997 | Souders | B32B 5/06 156/148 |
| 5,614,285 A * | 3/1997 | Gardill | B29C 70/345 428/156 |
| 5,618,365 A * | 4/1997 | Rebeyrolle | B29C 57/00 156/73.1 |
| 5,624,622 A * | 4/1997 | Boyce | B29C 44/569 264/258 |
| 5,660,903 A * | 8/1997 | Andersen | B01F 3/1214 428/36.4 |
| 5,660,908 A * | 8/1997 | Kelman | B32B 3/26 428/74 |
| 5,683,772 A * | 11/1997 | Andersen | B65D 65/466 206/524.3 |
| 5,725,940 A * | 3/1998 | Sakai | B29C 70/086 428/318.6 |
| 5,783,272 A * | 7/1998 | Wong | B29B 15/122 264/51 |
| 5,830,548 A * | 11/1998 | Andersen | B28B 1/00 428/36.4 |
| 6,136,415 A * | 10/2000 | Spengler | B29C 44/569 264/46.6 |
| 6,451,231 B1 * | 9/2002 | Harrison | B29C 70/66 264/45.3 |
| 6,982,021 B2 * | 1/2006 | Spengler | B29C 43/203 156/221 |
| 7,138,027 B1 * | 11/2006 | Canizales | B29C 43/203 156/245 |
| 10,343,328 B1 * | 7/2019 | Sherga | B29C 51/002 |
| 10,358,554 B2 * | 7/2019 | Sherga | C08L 25/06 |
| 2003/0034588 A1 * | 2/2003 | Miura | B29C 43/10 264/258 |
| 2003/0227107 A1 * | 12/2003 | Stewart | B29C 43/183 264/236 |
| 2004/0118504 A1 * | 6/2004 | Herrmann | B29C 43/003 156/160 |
| 2005/0189674 A1 * | 9/2005 | Hochet | B29C 53/063 264/138 |
| 2005/0230864 A1 * | 10/2005 | Ozasa | B29C 43/003 264/102 |
| 2006/0145506 A1 * | 7/2006 | Braun | B29C 43/003 296/70 |
| 2008/0018026 A1 * | 1/2008 | Gregg | B29C 48/07 264/519 |
| 2008/0145599 A1 * | 6/2008 | Khan | B29D 99/0089 428/116 |
| 2008/0197536 A1 * | 8/2008 | Fujii | B27N 3/08 264/320 |
| 2009/0126974 A1 * | 5/2009 | Yuasa | B29C 70/506 174/250 |
| 2010/0109185 A1 * | 5/2010 | Ogawa | B29C 43/222 264/177.19 |
| 2013/0000826 A1 * | 1/2013 | Katz | B29B 17/0042 156/196 |
| 2013/0127092 A1 * | 5/2013 | Dauner | B29C 44/1228 264/415 |
| 2013/0189482 A1 * | 7/2013 | Dequine | B29C 43/52 428/130 |
| 2013/0242487 A1 * | 9/2013 | Fujioka | B29C 45/14221 361/679.01 |
| 2013/0278003 A1 * | 10/2013 | Preisler | B60R 5/00 296/37.5 |
| 2014/0117588 A1 * | 5/2014 | Schindler, II | B41M 3/00 264/405 |
| 2014/0147622 A1 * | 5/2014 | Preisler | B29C 43/00 428/116 |
| 2014/0199515 A1 * | 7/2014 | Oyabu | B32B 5/02 428/141 |
| 2015/0132532 A1 | 5/2015 | Perisler et al. | |
| 2016/0176153 A1 * | 6/2016 | Dietz | B29C 51/14 428/116 |
| 2017/0144337 A1 * | 5/2017 | Matsen | B29C 43/52 |
| 2017/0182729 A1 * | 6/2017 | Fox | B32B 3/08 |
| 2018/0036922 A1 * | 2/2018 | Walters | B29C 43/36 |
| 2019/0009497 A1 * | 1/2019 | Sasaki | B32B 5/14 |
| 2019/0240948 A1 * | 8/2019 | Young | B64D 11/02 |

* cited by examiner

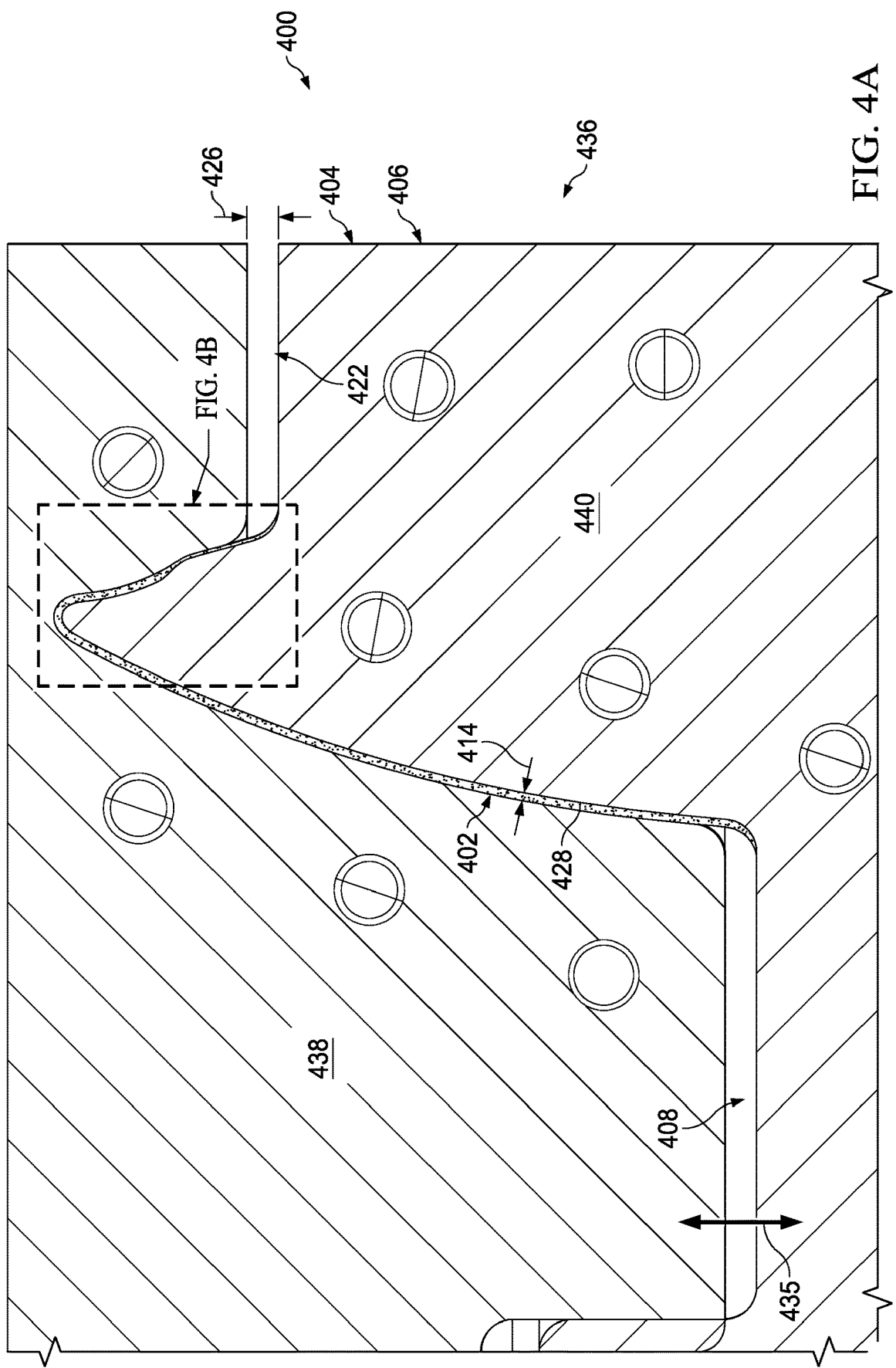

COMPOSITE SANDWICH PANELS WITH OVER-CRUSHED EDGE REGIONS

BACKGROUND INFORMATION

1. Field

The present disclosure relates generally to composite sandwich panels and, more specifically, to forming edges of composite sandwich panels without additional edge treatment.

2. Background

Contoured composite panel fabrication creates a panel edge that is unfinished. After cutting of the panel to net shape, a cured pre-preg and hollow cell core sandwich structure can be seen on the edges of the cut panel.

Visible edges of composite sandwich panels undergo edge treatment to create aesthetically pleasing edges. The edge treatment is a secondary decorative or assembly process to cover up the edges of a panel that are visible to the cabin interior. The edge treatment conceals the visible core cells of the trimmed composite sandwich panel edge. Panel edge treatment options for visible panel edges include composite trim, decorative laminate edge wrap, edge potting or edge filling followed by painting, or foam. Edge treatment processes add at least one of cost, weight to the aircraft, flow time, or operator hours.

Therefore, it would be desirable to have a method and apparatus that take into account at least some of the issues discussed above, as well as other possible issues. It would be desirable to have a manufacturing process for composite sandwich panels with visible edges that reduces at least one of cost, weight, flow time, or operator hours.

SUMMARY

An illustrative embodiment of the present disclosure provides a method. A first composite skin, a second composite skin, and a hollow cell core are loaded into a tool comprising opposing dies. The first composite skin, the second composite skin, and the hollow cell core are compressed using the opposing dies to form and consolidate a composite sandwich panel having a first over-crush edge region comprising a first thickness at least 40% less than a nominal thickness of the composite sandwich panel.

Another illustrative embodiment of the present disclosure provides a composite sandwich panel. The composite sandwich panel comprises a first composite skin, a second composite skin, a hollow cell core between the first composite skin and the second composite skin, and a first over-crush edge region with a first edge. The first edge has a first thickness at least 40% less than a nominal thickness of the composite sandwich panel. The first over-crush edge region has a length of at least 0.25 inches over which a thickness of the composite sandwich panel decreases.

Yet another illustrative embodiment of the present disclosure provides compression molding tool. Compression molding tool comprises opposing dies moveable relative to each other and an interior shape formed by the opposing dies. The opposing dies comprise a first over-crush forming feature configured to form a first over-crush edge region of a composite sandwich panel. The interior shape comprises a nominal thickness, a first thickness in a region formed by the first over-crush forming feature, a transition region between the nominal thickness and the first thickness, and a periphery region surrounding the nominal thickness and the first thickness. The first thickness is at least 40% less than the nominal thickness. A length of the transition region is at least 0.25 inches. A thickness in the periphery region is greater than the nominal thickness.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 4A and 4B are an illustration of a cross-sectional view of a tool for forming a composite sandwich panel with over-crushed edge regions in accordance with an illustrative embodiment;

DETAILED DESCRIPTION

The illustrative embodiments recognize and take into account one or more different considerations. For example, the illustrative embodiments recognize and take into account that composite sandwich panels have a high strength to weight ratio. The illustrative embodiments recognize and take into account that to form composite sandwich panels, composite skins are compressed against a hollow cell core. The illustrative embodiments recognize and take into account that conventionally, it is desirable to prevent overcrush of the hollow cell core.

Figure 1:
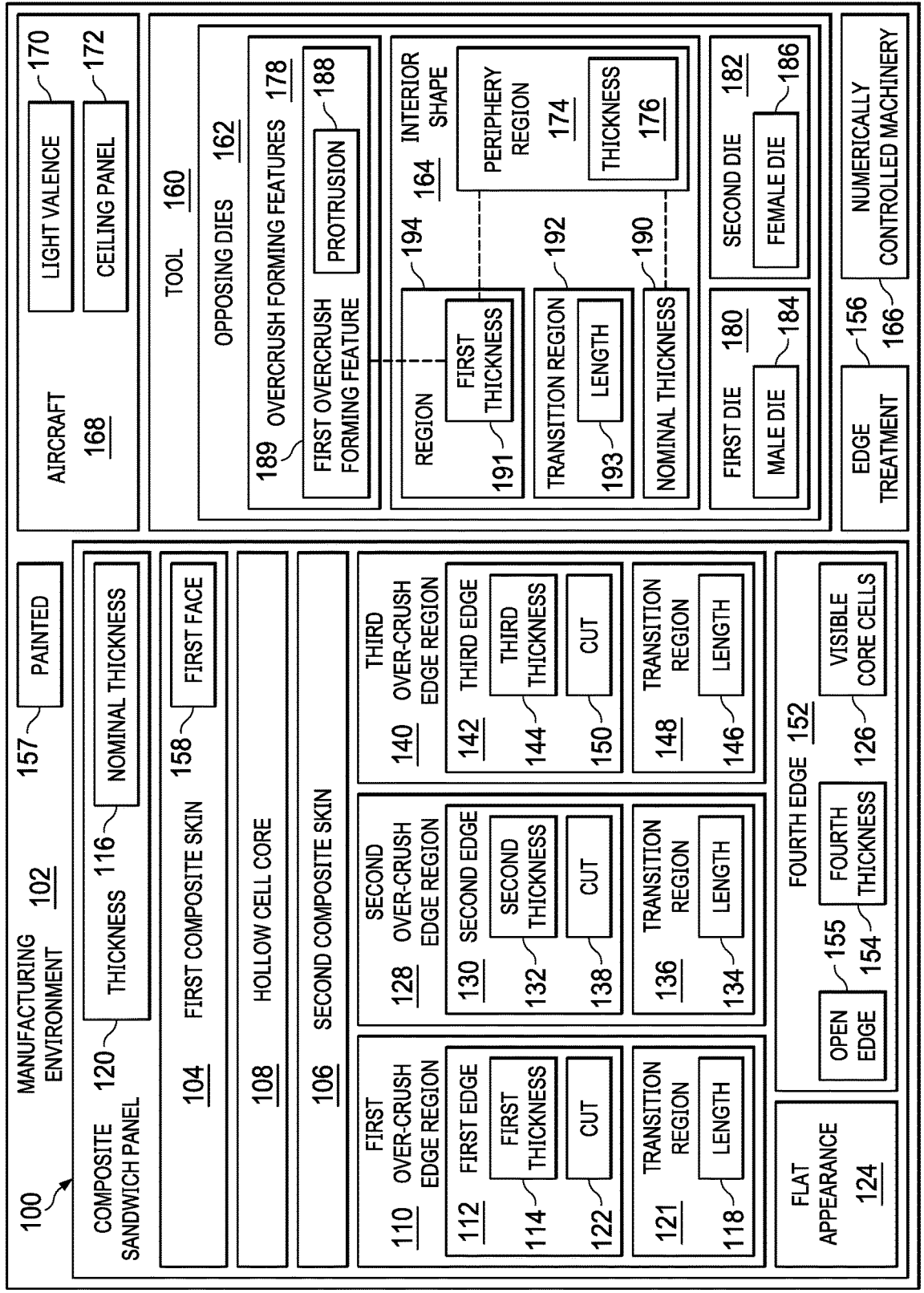
FIG. 1 is an illustration of a block diagram of a manufacturing environment in which composite sandwich panels are formed in accordance with an illustrative embodiment.

Referring now to the figures and, in particular, with reference to FIG. 1, an illustration of a block diagram of a manufacturing environment in which composite sandwich panels are used to form a door is depicted in accordance with an illustrative embodiment. Composite sandwich panel 100 in manufacturing environment 102 comprises first composite skin 104, second composite skin 106, hollow cell core 108 between first composite skin 104 and second composite skin 106, and first over-crush edge region 110 with first edge 112. First edge 112 has first thickness 114 at least 40% less than nominal thickness 116 of composite sandwich panel 100.

First over-crush edge region 110 has length 118 of at least 0.25 inches over which thickness 120 of composite sandwich panel 100 decreases. Thickness 120 of composite sandwich panel 100 is reduced in transition region 121 having length 118. In some illustrative examples, length 118 is in the range of 0.25 inches to 1 inch. In some illustrative examples, length 118 is over an inch. Length 118 of transition region 121 is selected to reduce inconsistencies in composite sandwich panel 100 from compression of first composite skin 104, second composite skin 106, and hollow cell core 108. Length 118 of transition region 121 is selected based on geometry of composite sandwich panel 100 and thickness 120. Thickness 120 of composite sandwich panel 100 decreases within first over-crush edge region 110 in a direction towards first edge 112.

Nominal thickness 116 is thickness 120 of composite sandwich panel 100 after consolidation of first composite skin 104, hollow cell core 108, and second composite skin 106 to form composite sandwich panel 100. In some illustrative examples, consolidation results in approximately 5%-10% reduction of thickness to form nominal thickness 116 of composite sandwich panel 100. In these illustrative examples, a thickness of an unconsolidated assembly comprising first composite skin 104, hollow cell core 108, and second composite skin 106 reduces about 5%-10% to form nominal thickness 116 of composite sandwich panel 100.

In some illustrative examples, hollow cell core 108 takes the form of honeycomb core. First thickness 114 is in the range of 20%-60% of nominal thickness 116 of composite sandwich panel 100. First thickness 114 may also be described as in the range of 40% over-crush to 80% over-crush.

First edge 112 is cut 122. Portions of first composite skin 104, hollow cell core 108, and second composite skin 106 are visible at first edge 112. First edge 112 has flat appearance 124 with no visible core cells 126.

In some illustrative examples, composite sandwich panel 100 further comprises second over-crush edge region 128. Second over-crush edge region 128 comprises second edge 130 with second thickness 132. Second edge 130 has second thickness 132 at least 40% less than nominal thickness 116 of composite sandwich panel 100. Second over-crush edge region 128 has length 134 of at least 0.25 inches over which thickness 120 of composite sandwich panel 100 decreases. Thickness 120 of composite sandwich panel 100 is reduced in transition region 136 having length 134. In some illustrative examples, length 134 is in the range of 0.25 inches to 1 inch. In some illustrative examples, length 134 is over an inch. Length 134 of transition region 136 is selected to reduce inconsistencies in composite sandwich panel 100 from compression of first composite skin 104, second composite skin 106, and hollow cell core 108. Length 134 of transition region 136 is selected based on geometry of composite sandwich panel 100 and thickness 120. Thickness 120 of composite sandwich panel 100 decreases within second over-crush edge region 128 in a direction towards second edge 130.

Second thickness 132 is in the range of 20%-60% of nominal thickness 116 of composite sandwich panel 100. Second thickness 132 may also be described as in the range of 40% over-crush to 80% over-crush.

Second edge 130 is cut 138. Portions of first composite skin 104, hollow cell core 108, and second composite skin 106 are visible at second edge 130. Second edge 130 has flat appearance 124 without visible core cells 126.

In some illustrative examples, composite sandwich panel 100 further comprises third over-crush edge region 140. Third over-crush edge region 140 comprises third edge 142 with third thickness 144. Third edge 142 has third thickness 144 at least 40% less than nominal thickness 116 of composite sandwich panel 100. Third over-crush edge region 140 has length 146 of at least 0.25 inches over which thickness 120 of composite sandwich panel 100 decreases. Thickness 120 of composite sandwich panel 100 is reduced in transition region 148 having length 146. In some illustrative examples, length 146 is in the range of 0.25 inches to 1 inch. In some illustrative examples, length 146 is over an inch. Length 146 of transition region 148 is selected to reduce inconsistencies in composite sandwich panel 100 from compression of first composite skin 104, second composite skin 106, and hollow cell core 108. Length 146 of transition region 148 is selected based on geometry of composite sandwich panel 100 and thickness 120. Thickness 120 of composite sandwich panel 100 decreases within third over-crush edge region 140 in a direction towards third edge 142.

Third thickness 144 is in the range of 20%-60% of nominal thickness 116 of composite sandwich panel 100. Third thickness 144 may also be described as in the range of 40% over-crush to 80% over-crush.

Third edge 142 is cut 150. Portions of first composite skin 104, hollow cell core 108, and second composite skin 106 are visible at third edge 142. Third edge 142 has flat appearance 124 without visible core cells 126.

Composite sandwich panel 100 comprises fourth edge 152. Fourth edge 152 has fourth thickness 154. Fourth thickness 154 is substantially the same as nominal thickness 116. In some illustrative examples, fourth edge 152 is referred to as open edge 155. Fourth edge 152 has visible core cells 126. In some illustrative examples, edge treatment 156 is applied to fourth edge 152 to cover visible core cells 126. Edge treatment 156 includes any desirable treatment to conceal visible core cells 126. In some illustrative examples, edge treatment 156 is at least one of composite trim, decorative laminate edge wrap, edge potting or edge filling followed by painting, or foam.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In some illustrative examples, portions of composite sandwich panel 100 are painted 157. In some illustrative examples, at least one of first face 158, first edge 112, second edge 130, or third edge 142 is painted 157. First face 158 is formed of first composite skin 104. When first edge 112 is painted, the edge treatment of first edge 112 may take less time than a conventional edge treatment of visible core cells.

By forming composite sandwich panel 100 in a crush core press, at least one edge is "over-crushed" to the point that the at least one edge behaves like a solid fiberglass laminate. In this illustrative example, each of first edge 112, second edge 130, and third edge 142 is produced using an "over-crush" process. The "over-crush" process uses heat and pressure to compress hollow cell core 108, first composite skin 104, and second composite skin 106 into a solid substrate along each of first edge 112, second edge 130, and third edge 142 of composite sandwich panel 100.

By using this "over-crush" process on first edge 112, second edge 130, and third edge 142, durable edges are created that do not use edge trims. Fourth edge 152 of composite sandwich panel 100, which is not over-crushed, allows volatile compounds to escape during the molding process.

By over-crushing first edge 112, additional separate edge treatment may be optional. By over-crushing first edge 112, at least a portion of edge treatment of first edge 112 is performed during consolidation of composite sandwich panel 100.

To form composite sandwich panel 100, hollow cell core 108, first composite skin 104, and second composite skin 106 are placed into tool 160 with opposing dies 162. When closed, opposing dies 162 of tool 160 form interior shape 164. Interior shape 164 applies "over-crush" pressure to portions of composite sandwich panel 100 to form first over-crush edge region 110, second over-crush edge region 128, and third over-crush edge region 140.

After performing an "over-crush" process to form composite sandwich panel 100, composite sandwich panel 100 is cut using numerically controlled machinery 166. Numerically controlled machinery 166 is used to form cut 122 first edge 112, cut 138 second edge 130, and cut 150 third edge 142.

Composite sandwich panel 100 may have any desirable shape depending on desirable usage. Composite sandwich panel 100 is formed and shaped using tool 160 and numerically controlled machinery 166. In some illustrative examples, composite sandwich panel 100 forms at least a portion of a component of aircraft 168. Composite sandwich panel 100 may form any desirable interior composite sandwich panel of aircraft 168. In some illustrative examples, composite sandwich panel 100 forms light valence 170. In some illustrative examples, composite sandwich panel 100 forms ceiling panel 172.

Tool 160 is configured to form composite sandwich panel 100 with over-crush regions such as first over-crush edge region 110. Tool 160 is closed to form interior shape 164 between opposing dies 162. Interior shape 164 forms first over-crush edge region 110. Interior shape 164 further comprises periphery region 174 having thickness 176 greater than nominal thickness 116.

Periphery region 174 surrounds first over-crush edge region 110, second over-crush edge region 128, third over-crush edge region 140, and fourth edge 152 when composite sandwich panel 100 is present in tool 160. Periphery region 174 allows for release of volatiles from composite sandwich panel 100 during compression. Periphery region 174 decreases inconsistencies in composite sandwich panel 100 by increasing the rate of release of volatiles. Periphery region 174 "opens up" in thickness after over-crush forming features 178 selectively reduce thickness in respective regions of interior shape 164 to create first over-crush edge region 110, second over-crush edge region 128, third over-crush edge region 140.

In some illustrative examples, the length of an over-crush region after the panel net trim location is kept to a minimum. The portions after the panel net trim location will be trimmed to create composite sandwich panel 100. For example, the length of an over-crush region following portions of tool 160 forming first over-crush edge region 110, second over-crush edge region 128, and third over-crush edge region 140 is short. By keeping the length of an over-crush region after the panel net trim location short, inconsistencies such as pulling or over-crush outside of desired areas may be reduced or eliminated. When over-crush locations near the panel net trim location are short, extra fiberglass and core material is not undesirably pulled and formed to a state of over-crush during the press operation beyond the designed over-crush regions. Panel producibility is improved when the length of an over-crush regions near the net trim location is short. Panel producibility is improved because extra unneeded raw material is not formed and drawn in tool 160. Periphery region 174 surrounds the over-crush regions near the net trim location. Periphery region 174 is the area of the tool that "opens back up" to a greater thickness, thickness 176, than the nominal thickness 116.

In some illustrative examples, portions of first composite skin 104, second composite skin 106, and hollow cell core 108 are present in periphery region 174 during consolidation of composite sandwich panel 100. In these illustrative examples, the portions of first composite skin 104, second composite skin 106, and hollow cell core 108 present in periphery region 174 are removed using numerically controlled machinery 166 to form composite sandwich panel 100.

In some illustrative examples, some of at least one of first composite skin 104, second composite skin 106, and hollow cell core 108 over-crushed by over-crush forming features 178 is removed using numerically controlled machinery 166 to form composite sandwich panel 100. For example, a first over-crushed portion of first composite skin 104, second composite skin 106, and hollow cell core 108 formed by a first over-crush forming feature may be cut by numerically controlled machinery 166 to form cut 122 first edge 112. In this example, first thickness 114 continues through the net trim location for first edge 112.

As another example, a second over-crushed portion of first composite skin 104, second composite skin 106, and hollow cell core 108 formed by a second over-crush forming feature may be cut by numerically controlled machinery 166 to form cut 138 second edge 130. In this example, second thickness 132 continues through the net trim location for second edge 130.

As depicted, opposing dies 162 include first die 180 and second die 182. In some illustrative examples, opposing dies 162 may include additional dies along with first die 180 and second die 182. In some illustrative examples, over-crush forming features 178 are found on only one of first die 180 or second die 182. In some illustrative examples, over-crush forming features 178 are present on both first die 180 or second die 182.

In some illustrative examples, first die 180 may be referred to as male die 184 while second die 182 may be referred to as female die 186. In these illustrative examples, over-crush forming features 178 include protrusions, such as protrusion 188, on male die 184.

In some illustrative examples, tool 160 may be referred to as a compression molding tool. In one illustrative example, the compression molding tool, tool 160, comprises opposing dies 162 moveable relative to each other and interior shape 164 formed by opposing dies 162. Opposing dies 162 comprise first over-crush forming feature 189 configured to form first over-crush edge region 110 of composite sandwich panel 100.

Interior shape 164 is formed by opposing dies 162. Interior shape 164 comprises nominal thickness 190, first thickness 191 in region 194 formed by first over-crush forming feature 189, transition region 192 between nominal thickness 190 and first thickness 191, and periphery region 174 surrounding nominal thickness 190 and first thickness 191. Nominal thickness 190 is the same as nominal thickness 116 of composite sandwich panel 100. Nominal thickness 190 is configured to consolidate a composite sandwich panel, such as composite sandwich panel 100. First thickness 191 is the same as first thickness 114 of composite sandwich panel 100. First thickness 191 is configured to over-crush portions of a composite sandwich panel, such as composite sandwich panel 100.

First thickness 191 is at least 40% less than the nominal thickness 190. In some illustrative examples, length 193 of transition region 192 is at least 0.25 inches.

Thickness 176 in periphery region 174 is greater than nominal thickness 190. In some illustrative examples, thickness 176 in the periphery region 174 is at least twice nominal thickness 190. In some illustrative examples, first thickness 191 is in the range of 0.050 inches to 0.10 inches. In some illustrative examples, periphery region 174 is substantially perpendicular to a direction opposing dies 162 are moveable relative to each other as periphery region 174 extends away from region 194 towards an outside of tool 160.

The illustration of manufacturing environment 102 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
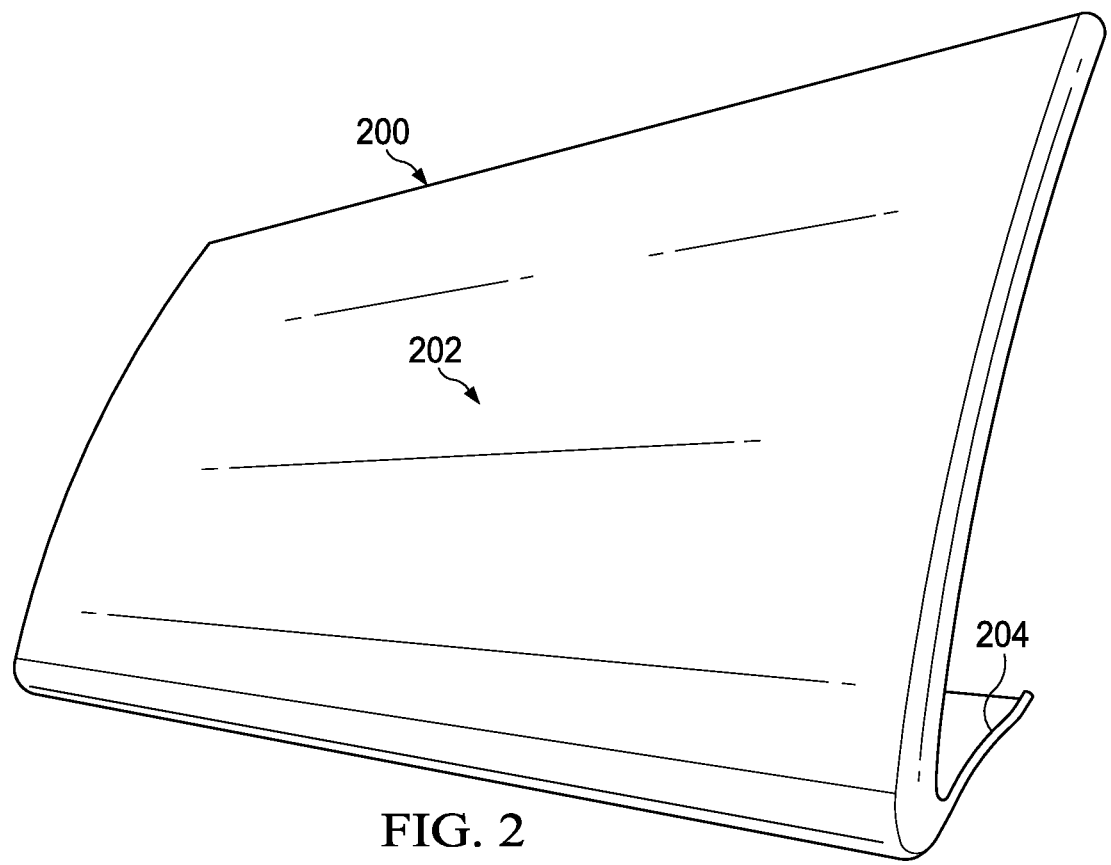
FIG. 2 is an illustration of a perspective view of a light valence formed of a composite sandwich panel in accordance with an illustrative embodiment.

Turning now to FIG. 2, an illustration of a perspective view of a light valence formed of a composite sandwich panel is depicted in accordance with an illustrative embodiment. Light valence 200 comprises composite sandwich panel 202. Composite sandwich panel 202 is a physical implementation of composite sandwich panel 100 of FIG. 1. Composite sandwich panel 202 has visible edge 204. Visible edge 204 is a physical implementation of first edge 112 of FIG. 1.

As depicted, visible edge 204 is a cut over-crushed edge. Visible edge 204 has a thickness at least 40% less than a nominal thickness of composite sandwich panel 202. In some illustrative examples, visible edge 204 does not have edge treatment. In some illustrative examples, visible edge 204 is painted.

Figure 3:
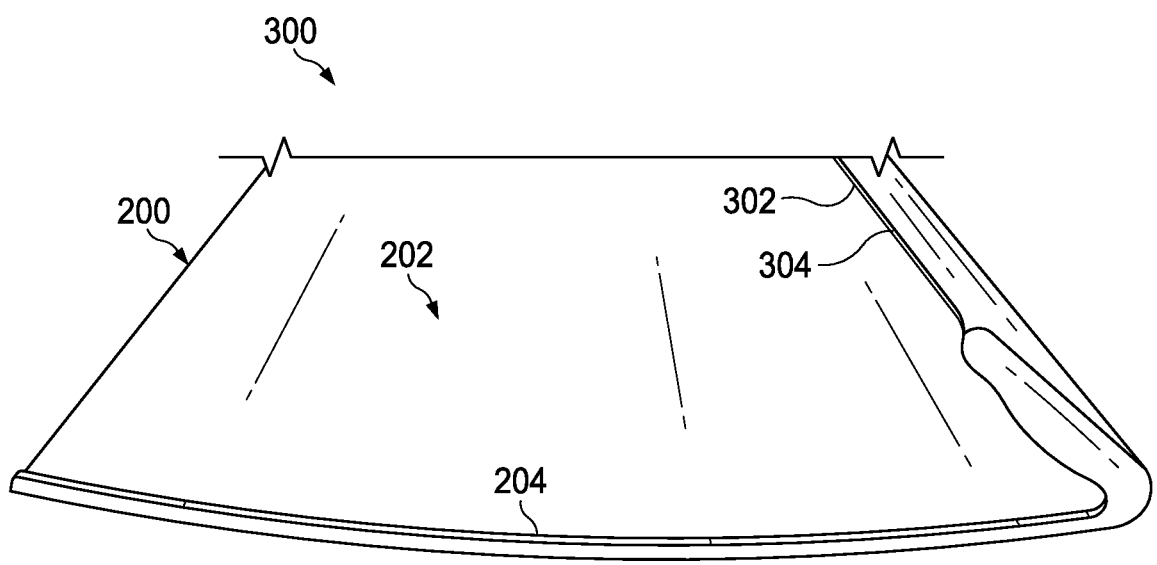
FIG. 3 is an illustration of a side view of a light valence formed of a composite sandwich panel in accordance with an illustrative embodiment.

Turning now to FIG. 3, an illustration of a side view of a light valence formed of a composite sandwich panel is depicted in accordance with an illustrative embodiment. View 300 is a side view of light valence 200 from visible edge 204.

In view 300, second edge 302 is visible. Second edge 302 is a physical implementation of second edge 130 of FIG. 1. Second edge 302 has thickness 304. Thickness 304 is at least 40% less than a nominal thickness of composite sandwich panel 202. In some illustrative examples, second edge 302 does not have edge treatment. In some illustrative examples, second edge 302 is painted.

Figure 4B:
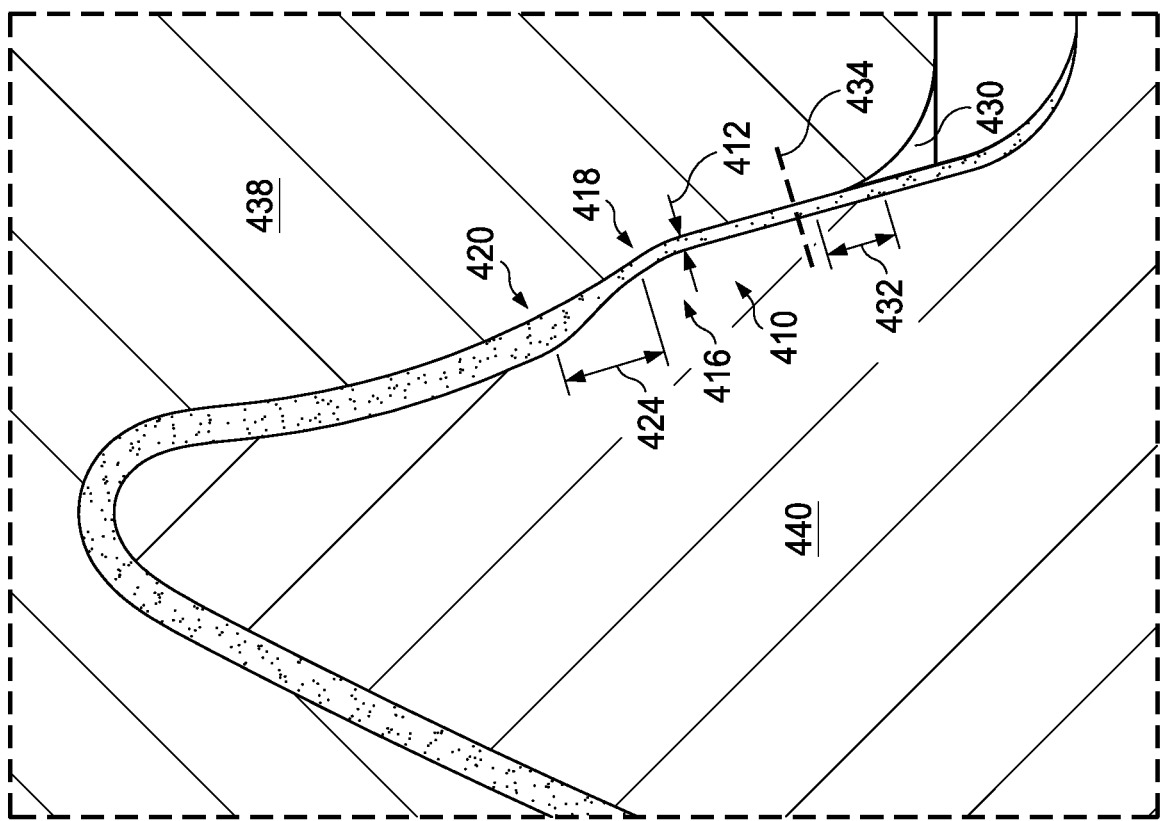

Turning now to FIGS. 4A and 4B, an illustration of a cross-sectional view of a tool for forming a composite sandwich panel with over-crushed edge regions in accordance with an illustrative embodiment. View 400 shows composite sandwich panel 402 within tool 404. Composite sandwich panel 402 is a physical implementation of composite sandwich panel 100 of FIG. 1. In some illustrative examples, after compressing composite sandwich panel 402 in tool 404, composite sandwich panel 402 forms light valence 200. Tool 404 is a physical implementation of tool 160 of FIG. 1.

As depicted, tool 404 comprises opposing dies 406 movable relative to each other, and interior shape 408 formed by opposing dies 406. Opposing dies 406 comprise first over-crush forming feature 410 configured to form first over-crush edge region 412 of a composite sandwich panel 402.

Interior shape 408 is formed by opposing dies 406. Interior shape 408 comprises nominal thickness 414, first thickness 416 in region 418 formed by first over-crush forming feature 410, transition region 420 between nominal thickness 414 and first thickness 416, and periphery region 422 surrounding nominal thickness 414 and first thickness 416.

First thickness 416 is at least 40% less than the nominal thickness 414. In some illustrative examples, first thickness 416 is in the range of 0.050 inches to 0.10 inches.

Length 424 of transition region 420 is at least 0.25 inches. Thickness 426 in periphery region 422 is greater than nominal thickness 414. As depicted, thickness 426 in periphery region 422 is at least twice nominal thickness 414.

Tool 404 is configured to compress composite sandwich panel 402 to form part 428 having first over-crush edge region 430. Tool 404 is configured to form part 428 with a desirable quality and limited inconsistencies.

For example, length 432 of first over-crush edge region 430 near panel net trim location 434 will reduce fiberglass and core material to be pulled and formed during the press operation in a state of over-crush beyond the over-crush region. This will help panel producibility as to not allow excessive and unneeded raw material draw in the tool. This is the area of the tool that will open back up thicker than the nominal panel thickness.

As depicted, periphery region 422 is substantially perpendicular to direction 435 opposing dies 406 are moveable relative to each other as periphery region 422 extends away from region 418 towards outside 436 of tool 404. Opposing dies 406 comprise first die 438 and second die 440 movable in direction 435 relative to each other. Periphery region 422 formed by first die 438 and second die 440 is substantially perpendicular to direction 435 in view 400. View 400 is a cross-sectional view through first die 438 and second die 440.

Figure 5:
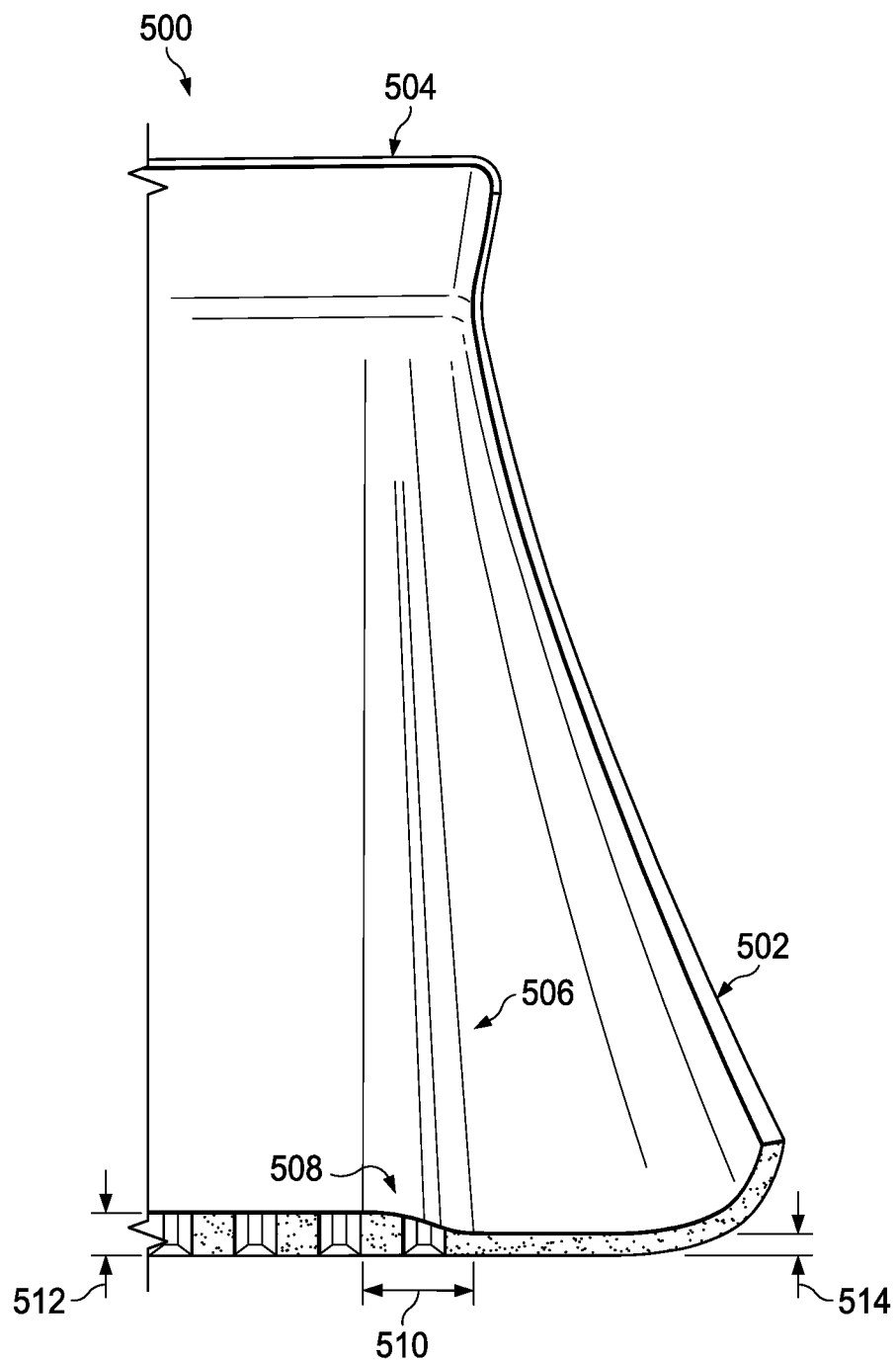
FIG. 5 is an illustration of a cross-sectional view of a composite sandwich panel in accordance with an illustrative embodiment.

Turning now to FIG. 5, an illustration of a cross-sectional view of a composite sandwich panel is depicted in accordance with an illustrative embodiment. Composite sandwich panel 500 is a physical implementation of composite sandwich panel 100 of FIG. 1.

Composite sandwich panel 500 has first edge 502 and second edge 504. As depicted, both first edge 502 and second edge 504 are formed through an over-crush process and trimming by a numerically-controlled machine.

As depicted, first over-crush edge region 506 includes first edge 502. As depicted, first edge 502 is a rolled edge.

First over-crush edge region 506 includes transition region 508 having length 510. Length 510 is at least 0.25 inches. Transition region 508 goes from nominal thickness 512 to first thickness 514 of first edge 502 across transition region 508.

Figure 6:
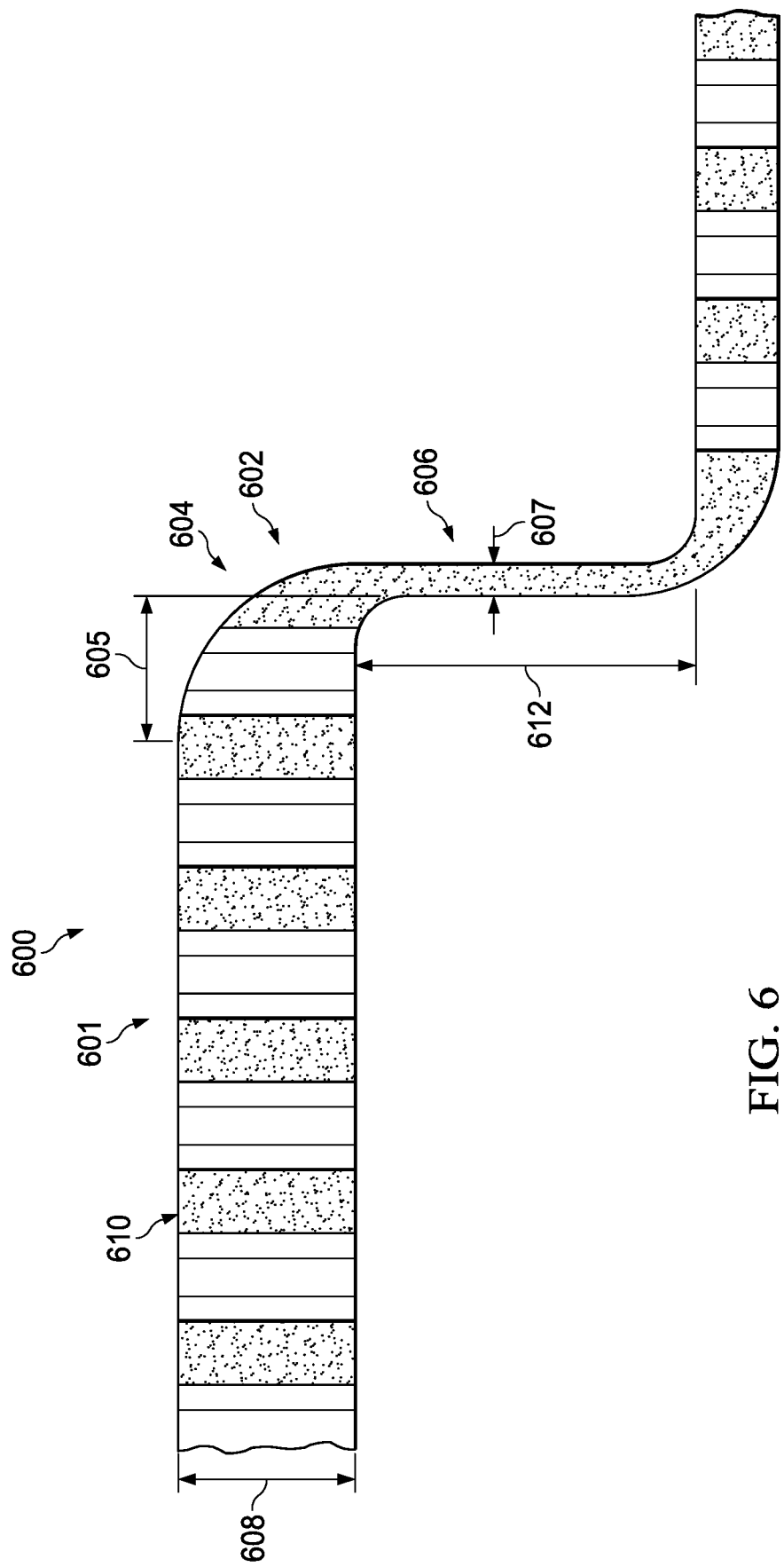
FIG. 6 is an illustration of a cross-sectional view of a first over-crush edge region of a composite sandwich panel in accordance with an illustrative embodiment.

Turning now to FIG. 6, an illustration of a cross-sectional view of a first over-crush edge region of a composite sandwich panel is depicted in accordance with an illustrative embodiment. View 600 is a view of composite sandwich panel 601 after compression in a tool, such as tool 160 of FIG. 1, but prior to cutting to a net shape. Composite sandwich panel 601 is a physical implementation of composite sandwich panel 100 prior to cutting.

Composite sandwich panel 601 has first over-crush edge region 602 with transition region 604. Transition region 604 has length 605 of at least 0.25 inches. Section 606 of first over-crush edge region 602 has first thickness 607. First thickness 607 is at least 40% over-crush of nominal thickness 608. Section 606 is substantially perpendicular to section 610 of composite sandwich panel 601. In some illustrative examples, section 606 may be cut to form a rolled edge.

Length 612 of section 606 is minimized to reduce inconsistencies in composite sandwich panel 601. Limiting length 612 of section 606 will reduce fiberglass and core material beyond the over-crush region pulled and formed during the press operation. Minimizing length 612 of section 606 will help panel producibility as to not allow unneeded raw material draw in the tool.

Figure 7:
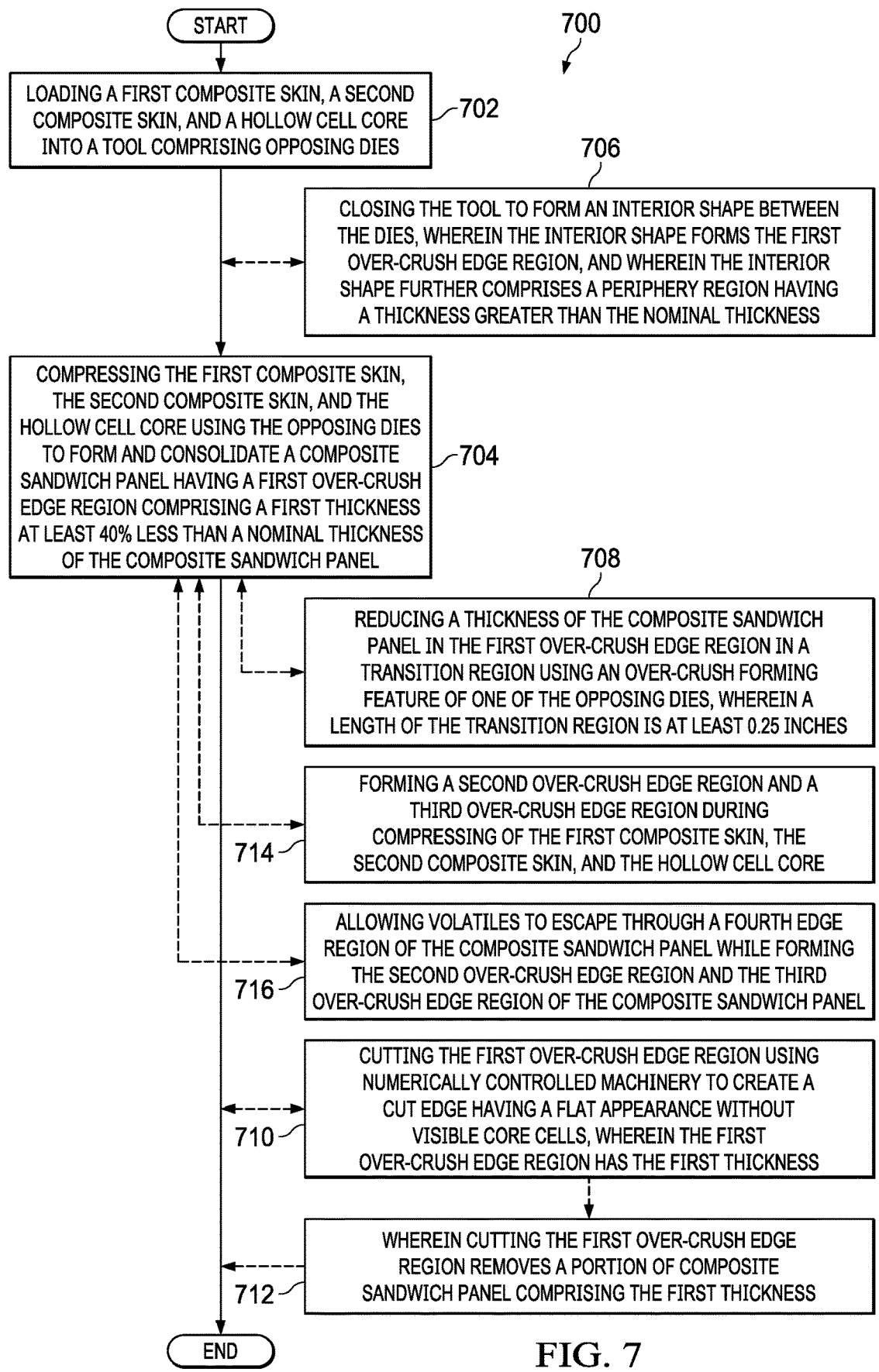
FIG. 7 is an illustration of a flowchart of a method for forming a composite sandwich panel in accordance with an illustrative embodiment.

Turning now to FIG. 7, an illustration of a flowchart of a method for forming a composite sandwich panel is depicted in accordance with an illustrative embodiment. Method 700 may be used to form composite sandwich panel 100 of FIG. 1. Method 700 may be performed using tool 160 of FIG. 1. Method 700 may be used to form any of composite sandwich panel 202 of FIG. 2, composite sandwich panel 500 of FIG. 5, or composite sandwich panel 601 of FIG. 6.

Method 700 loads a first composite skin, a second composite skin, and a hollow cell core into a tool comprising opposing dies (operation 702). Method 700 compresses the first composite skin, the second composite skin, and the hollow cell core using the opposing dies to form and consolidate a composite sandwich panel having a first over-crush edge region comprising a first thickness at least 40% less than a nominal thickness of the composite sandwich panel (operation 704).

In some illustrative examples, method 700 closes the tool to form an interior shape between the dies, wherein the interior shape forms the first over-crush edge region, and wherein the interior shape further comprises a periphery region having a thickness greater than the nominal thickness (operation 706). In some illustrative example, method 700 further reduces a thickness of the composite sandwich panel in the first over-crush edge region in a transition region using an over-crush forming feature of one of the opposing dies, wherein a length of the transition region is at least 0.25 inches (operation 708). In some illustrative examples, the over-crush forming feature comprises a protrusion.

In some illustrative examples, method 700 cuts the first over-crush edge region using numerically controlled machinery to create a cut edge having a flat appearance without visible core cells, wherein the first over-crush edge region has the first thickness (operation 710). In some illustrative examples, method 700 cuts the first over-crush edge region removes a portion of composite sandwich panel comprising the first thickness (operation 712). In some illustrative examples, the portion further comprises a thickness double the first thickness.

In some illustrative examples, method 700 forms a second over-crush edge region and a third over-crush edge region during compressing of the first composite skin, the second composite skin, and the hollow cell core (operation 714). In some illustrative examples, method 700 allows volatiles to escape through a fourth edge of the composite sandwich panel while forming the second over-crush edge region and the third over-crush edge region of the composite sandwich panel (operation 716).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 700 are performed. For example, operations 706 through 716 are optional.

Figure 8:
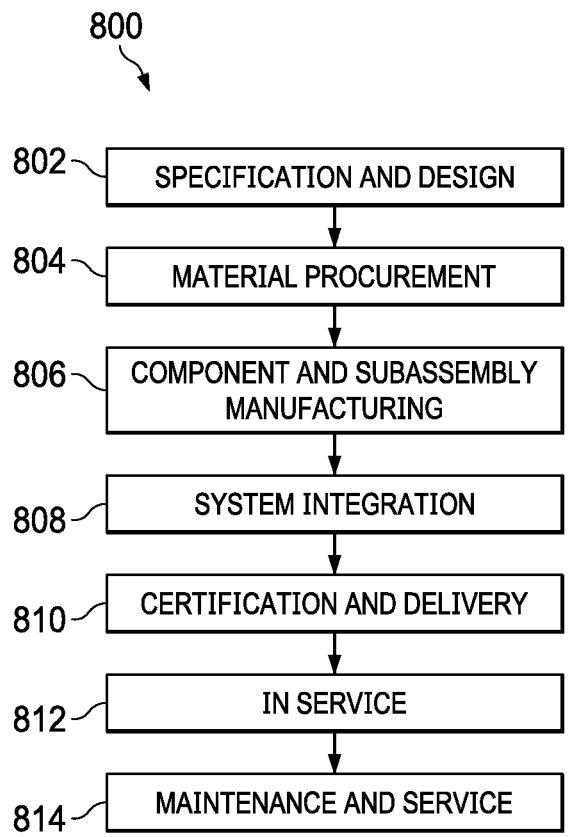
FIG. 8 is an illustration of an aircraft manufacturing and service method in the form of a block diagram in accordance with an illustrative embodiment.
Figure 9:
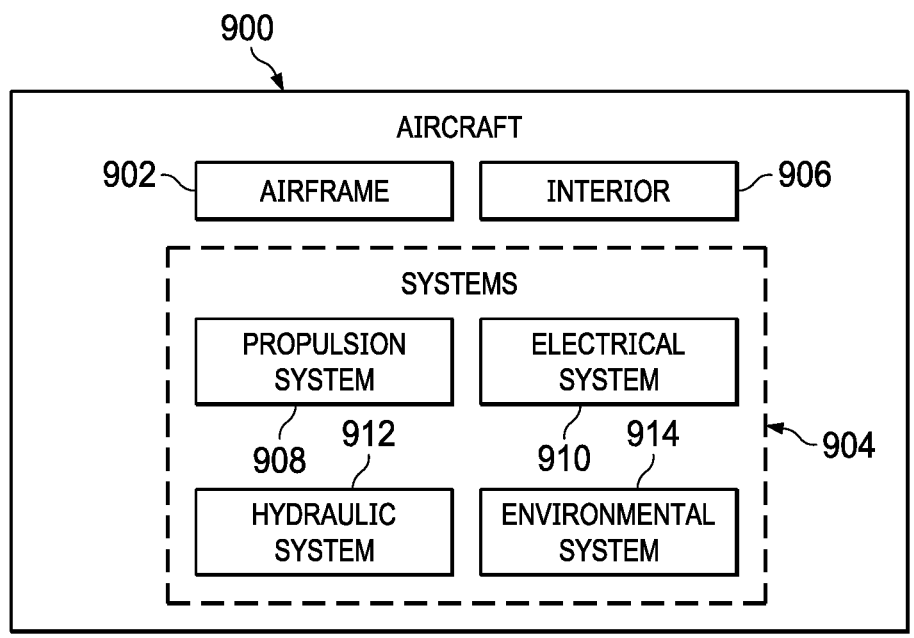
FIG. 9 is an illustration of an aircraft in the form of a block diagram in which an illustrative embodiment may be implemented.

The illustrative embodiments of the present disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 90900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812. While in service 812 by a customer, aircraft 900 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 in FIG. 8 and may include airframe 902 with a plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800. One or more illustrative embodiments may be used during component and subassembly manufacturing 806, system integration 808, or maintenance and service 814 of FIG. 8. For example, composite sandwich panel 100 may formed during component and subassembly manufacturing 806. As another example, composite sandwich panel 100 may be a replacement part during maintenance and service 814 of FIG. 8.

Apparatuses and methods embodied herein may be employed in manufacturing at least one component of aircraft 900. For example, composite sandwich panel 100 of FIG. 1 may be manufactured to form a portion of interior 906.

The illustrative examples present methods and apparatuses to form composite sandwich panels with reduced edge treatment time, cost, or weight. The illustrative examples present crushed core fiberglass panels to be used in aircraft. In some illustrative examples, the crushed core fiberglass panels may be light valences in a passenger cabin of an aircraft. In some illustrative examples, the crushed core fiberglass panels may be ceiling panels in a passenger cabin of an aircraft. Although two specific examples have been provided, the crushed core fiberglass panels presented in the illustrative examples may be used in any desirable location and for any desirable type of component with exposed edges on an aircraft.

The illustrative examples provide use of a panel over-crush design to accomplish edge treatment of visible panel edges seen from the customer in an aircraft cabin interior. The illustrative examples include composite panels with over crushed and consolidated panel edges. Over-crushing the composite sandwich panels provides a clean consolidated edge after 5-axis trimming to net shape. When composite sandwich panels with visible core cells are cut, edges may be fuzzy or rough, a condition which may be referred to as core flagging. No visible core flagging is present for over-crushed edges in the illustrative examples. After cutting an over-crushed edge, the panel is ready for paint or decorative application.

The illustrative examples integrate edge treatment in the process of forming the composite panel in a matched metal mold die. Panel thickness is drastically reduced at the edges of the panel where a visible edge treatment is desired. The illustrative examples reduce at least one of cost, weight, part count, part complexity, or flow rate. The illustrative examples provide a method of providing an edge treatment to interior panels that are painted. Painted panels will not receive a decorative film edge wrap process.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   loading a first composite skin, a second composite skin, and a hollow cell core into a tool comprising opposing dies;
   closing the tool to form an interior shape of the tool between the opposing dies, the interior shape comprising a periphery region; and
   compressing the first composite skin, the second composite skin, and the hollow cell core using the opposing dies to form and consolidate a composite sandwich panel having a nominal thickness while applying an over-crush pressure to portions of the composite sandwich panel to form a first over-crush edge region comprising an edge and a transition region, the edge having a first thickness at least 40% less than the nominal thickness of the composite sandwich panel, the nominal thickness being the thickness of the composite sandwich panel away from the first over- crush edge region after consolidating the first composite skin, the second composite skin, and the hollow cell core, wherein the periphery region surrounds the first over-crush edge region when the composite sandwich panel is in the tool and provides a path for volatiles, released from the composite sandwich panel during compression, to escape the tool between the opposing dies.

2. The method of claim 1, wherein the periphery region has a thickness greater than the nominal thickness.

3. The method of claim 1 further comprising:
   reducing a thickness of the composite sandwich panel from the nominal thickness to the first thickness in the transition region using an over-crush forming feature of one of the opposing dies, wherein a length of the transition region is at least 0.25 inches.

4. The method of claim 3, wherein the over-crush forming feature comprises a protrusion.

5. The method of claim 1 further comprising:
   cutting the first over-crush edge region using numerically controlled machinery to create a cut edge having a flat appearance without visible core cells.

6. The method of claim 5, wherein cutting the first over-crush edge region removes a portion of composite sandwich panel comprising the first thickness.

7. The method of claim 1, wherein the periphery region is substantially perpendicular to a direction the opposing dies are moveable relative to each other as the periphery region extends away from the first over-crush edge region towards an outside of the tool.

8. The method of claim 1 further comprising:
   forming a second over-crush edge region and a third over-crush edge region during compressing of the first composite skin, the second composite skin, and the hollow cell core; and
   allowing volatiles to escape through a fourth edge of the composite sandwich panel while forming the second over-crush edge region and the third over-crush edge region of the composite sandwich panel.

9. The method of claim 8, wherein the periphery region surrounds the second over-crush region, the third over-crush edge region, and the fourth edge when the composite sandwich panel is in the tool.

10. The method of claim 1, wherein the edge has a flat appearance with no visible core cells.

11. The method of claim 1, wherein the edge is a rolled edge.

12. The method of claim 1, further comprising paint covering the edge.

13. The method of claim 1, wherein the composite sandwich panel forms a light valence of an aircraft, and wherein the edge is visible to passengers on the aircraft.

14. The method of claim 1, wherein the composite sandwich panel further comprises an open edge having visible core cells, wherein the open edge is the nominal thickness of the composite sandwich panel.

15. The method of claim 14, wherein the composite sandwich panel further comprises an edge treatment applied to the open edge.

16. The method of claim 1, wherein the periphery region has a thickness at least twice the nominal thickness.

17. The method of claim 1, wherein the first thickness is in a range of 0.050 inches to 0.10 inches.

* * * * *